April 22, 1930. W. BÜSCHING 1,755,768
DENITRATION OF WASTE ACID MIXTURES
Filed Aug. 15, 1927
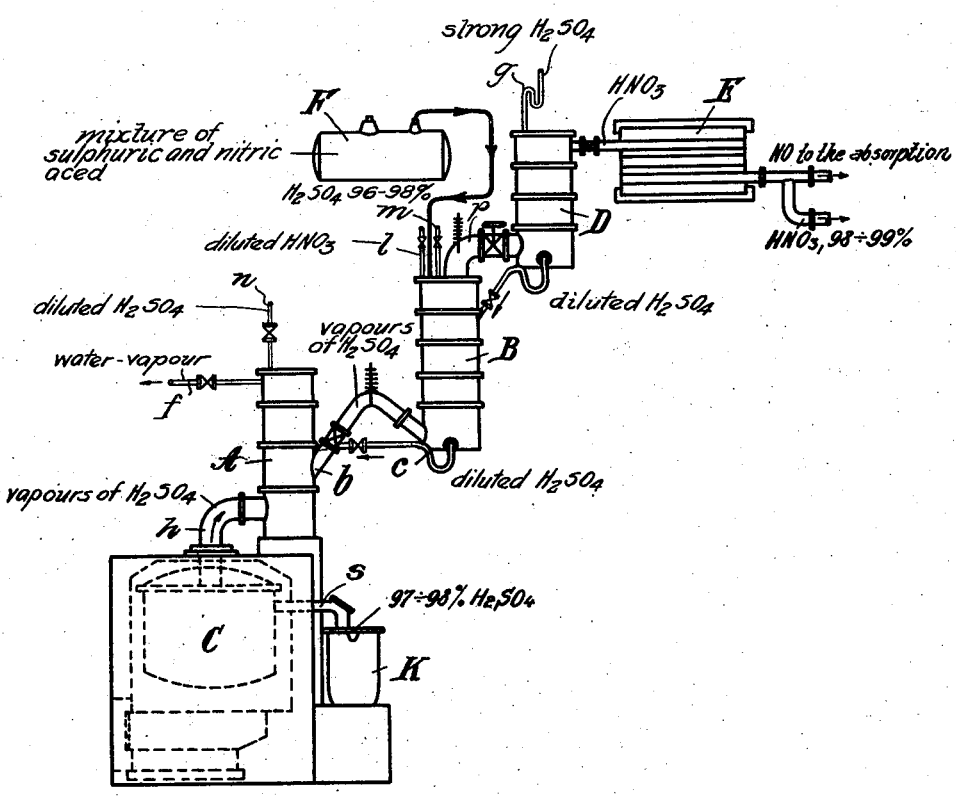
Inventor:
Willi Büsching
By Emil Bønnelycke
Attorney Patented Apr. 22, 1930

1,755,768

UNITED STATES PATENT OFFICE

WILLI BÜSCHING, OF HALLE-SAALE, GERMANY

DENITRATION OF WASTE ACID MIXTURES

Application filed August 15, 1927, Serial No. 213,025, and in Germany September 3, 1926.

The processes hitherto known for denitrating waste mixed acids consist in introducing the waste acid mixture into the upper portion of a column which is provided with a filling material, bell bottoms or other insertions, and superheated steam or superheated air into the lower portion of the column in counter-current to the flow of acid, thereby effecting a separation of the components contained in the waste acid, so that, for instance, by the process according to German Patent No. 182,126 or British Patent No. 17,316 of 1902, sulphuric acid of 65% to 70% concentration is obtained in the lower portion of the column, while from the upper portion thereof nitric acid vapor mixed with nitric oxide has to be introduced into a condensation plant for the further conversion to nitric acid. The dilute sulphuric acid leaving the denitration drum has then to be liberated from water by known processes in a separate high concentration apparatus so that the denitration is connected with considerable costs from the heat-supply point of view.

According to this invention it has been found that denitration of waste acid can be combined with considerable advantages, with the high concentration of sulphuric acid provided a portion of the vapors containing sulphuric acid and obtained during the high concentration is utilized to effect the denitration, the remaining portion of vapors being subjected to dephlegmation in order to get rid of the water entering with the waste mixed acids in the form of steam.

A plant for carrying the process into effect is illustrated diagrammatically in the annexed drawing.

Referring to the drawing B represents the denitration column, and C the high concentration boiler for the sulphuric acid. The sulphuric acid vapors escaping from C enter into the column A. A portion of these vapors passes by way of pipe $b$ into the column B and denitrates in known manner the waste acid introduced from container F into column B. The remainder of the vapors rising in column A is dephlegmated so that steam only escapes from the top of the column A.

The boiler C contains highly concentrated sulphuric acid which runs off continually either directly into the cooler K or the vapors are condensed in the column B and will be drawn off by means of pipe $c$. It will be evident from the drawing that vapors pass upwardly through the apparatus by way of the connecting tubes $h$, $b$ and $p$ and liquid downwardly by way of the smaller tubes $e$ and $c$.

The nitric acid vapors escaping from column B are washed in column D with sulphuric acid and dried so that the nitric acid vapors are recovered in likewise highly concentrated form in the cooler E while the remaining nitrose vapors pass into absorption towers (not shown). In a closed operating cycle therefore all components are obtained in their original form, that is to say as:—

1. Strong sulphuric acid
2. Pure water vapor
3. Strong nitric acid.

In a separate preliminary heater F the waste acid to be denitrated, for example, nitro-glycerine waste acid, is preliminarily heated so that the organic constituents contained in the waste acid are previously decomposed so that explosions arising often in the denitrating-column are avoided. Vapors given off during this treatment are appropriately removed into the absorption apparatus.

The present process also offers the advantage that the apparatus may be employed without alteration for the high concentration of nitric acid of sulphuric acid when the apparatus is not required for waste sulphuric nitric acid. The process ensures continuous use of the apparatus avoiding interruptions of working which, as is known, are injurious. Moreover with the aid of the same apparatus diluted nitric acid can be subjected to high concentration according to the process as set forth in German Patent No. 398,320. For the concentration of nitric acid dilute nitric acid is supplied to the column B by the pipe $l$ while by means of a tube $m$ sulphuric acid of 96–98% concentration is also led in so that nitric acid is concentrated in known manner. The column D serves merely then for the drying of the nitric acid vapor. By means of the tube $g$ strong sulphuric acid is introduced for washing the hot nitric acid and vapors which are then conducted to the condenser E, the nitric acid in vapor form thus being as free as possible from water. The high concentration of the sulphuric acid takes place in the column A, the dilute sulphuric acid to be concentrated is led in by way of the tube $n$ and flows in concentrated form from the chamber C into the cooler K. The water vapor escapes by way of the tube A.

What I claim is:—

1. A continuous process for denitrating waste acid comprising the steps of concentrating sulphuric acid, leading part of the sulphuric acid vapors into a denitration column in counter-current to a flow of heated waste acid, dephlegmating the remainder of the sulphuric acid by removing the water-steam from the nitric acid, washing the nitric acid vapors with sulphuric acid, condensing the nitric acid vapors to concentrated nitric acid and returning the washing sulphuric acid to the first concentration stage.

2. A continuous process for denitrating waste sulphuric-nitric acid comprising the steps of highly concentrating sulphuric acid in a column, leading part of the vapors containing sulphuric acid into a second denitrating column in counter current to a flow of heated waste acid, dephlegmating the remainder of the vapors containing sulphuric acid by removing the water vapor from the waste acid, washing the nitric acid vapors with sulphuric acid in a third column, condensing the nitric acid vapors to concentrated nitric acid and returning the washing sulphuric acid to the sulphuric acid concentrating boiler.

In testimony whereof I have affixed my signature.

WILLI BÜSCHING.